United States Patent [19]

Miyashiro et al.

[11] Patent Number: 4,493,894
[45] Date of Patent: Jan. 15, 1985

[54] POLYSACCHARIDE BEADS

[75] Inventors: Yutaka Miyashiro, Nara; Masao Ogawa, Osaka; Yoshio Yamazaki, Toyonaka; Seizi Igarasi, Ashiya, all of Japan

[73] Assignee: Takeda Chemical Industries, Ltd., Osaka, Japan

[21] Appl. No.: 187,974

[22] Filed: Sep. 16, 1980

Related U.S. Application Data

[62] Division of Ser. No. 958,641, Nov. 8, 1978, abandoned, which is a division of Ser. No. 734,352, Oct. 20, 1976, Pat. No. 4,143,201.

[30] Foreign Application Priority Data

Oct. 21, 1975 [JP] Japan ................................ 50-127196
May 24, 1976 [JP] Japan .................................. 51-60438

[51] Int. Cl.³ ............................................ A61K 31/71
[52] U.S. Cl. ...................................... 435/178; 435/101

[58] Field of Search ................................. 435/101, 178

[56] References Cited

U.S. PATENT DOCUMENTS

| 4,075,405 | 2/1978 | Takeshi | 435/178 |
| 4,102,743 | 7/1978 | Kaisha | 435/178 |
| 4,143,201 | 3/1979 | Miyashiro | 428/403 |

*Primary Examiner*—Sam Silverberg
*Attorney, Agent, or Firm*—Wenderoth, Lind & Ponack

[57] ABSTRACT

A matrix comprising a water-insoluble $\beta$-1,3-glucan gel in the shape of beads with diameters within the range of about 5 to 1000$\mu$ is prepared by, for example, dispersing an alkaline aqueous solution of a water-soluble $\beta$-1,3-glucan in a water-immiscible organic solvent, and adding an organic acid to the resultant dispersion. The matrix is useful as carrier materials for immobilized enzymes, affinity chromatography, gel filtration, ion exchange and other applications.

13 Claims, 4 Drawing Figures

United States Patent Office

PTO - BOYERS, PA Duty Station

MISSING PAGE TEMPORARY NOTICE

PATENT # 4493894 FOR ISSUE DATE 1-15-1985

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

Drawing figures 1 thru 4

Data Conversion Operation
Boyers, Pa

POLYSACCHARIDE BEADS

This application is a division of application Ser. No. 958,641, filed Nov. 8, 1978 (now abandoned), which application is in turn a division of application Ser. No. 734,352, filed Oct. 20, 1976 (now U.S. Pat. No. 4,143,201).

This invention relates to a matrix comprising a water-insoluble β-1,3-glucan gel in the shape of beads. The term "matrix" as used in the present specification and claims means any of carriers for immobilized enzymes, affinity chromatography, gel filtration, ion exchange and other applications, unless otherwise specified.

As the matrix materials hitherto employed, there may be mentioned polysaccharides. Among them are cellulose, dextran, starch and agarose as well as their derivatives. The ideal matrix materials for use as packed into columns for such immobilized enzyme and affinity chromatography applications should be (1) insoluble in water, (2) chemically and microbiologically stable, (3) mechanically rigid, (4) hydrophilic, (5) possessed of adequate chemical functionality, (6) ready to couple with enzymes and ligands, (7) spherical in shape to let liquids pass freely over it, (8) not nonspecifically adsorptive and (9) available at low cost, for instance.

Although none of the materials heretofore known satisfies all the above requirements, it is agarose gel alone that is relatively satisfactory. This material, however, is disadvantageous in that it is (1) unstable against acids, (2) introlerant to high temperatures and (3) unsuitable for the preparation of large-capacity columns of great packing heights because of its high compressibility.

The intensive research undertaken by the present inventors to overcome those disadvantages led to the finding that water-insoluble β-1,3-glucans are comparatively well equipped with the above properties and that such a β-1,3-glucan, in the shape of gel beads and when used as a matrix for immobilized enzymes and affinity chromatography, displays excellent flow rate properties as will be described in Reference Example and also has properties very much desirable in carriers for gel filtration, ion exchange and other applications. The present invention is predicated on the above findings.

Thus, it is an object of this invention to provide a matrix comprising a water-insoluble β-1,3-glucan gel in the shape of beads which is useful for immobilized enzymes, affinity chromatography, gel filtration, ion exchange and other applications.

Another object is to provide a method of producing a water-insoluble β-1,3-glucan gel in the shape of beads with diameters within the range of about 5 to 1000μ.

Other objects will become clear hereinafter as the disclosure proceeds.

BRIEF DESCRIPTION OF THE DRAWINGS

FIG. 1 compares the flow rate properties of the beads of the invention with a prior art material.

FIG. 2 shows the relationship between the molecular weight and distribution coefficients to demonstrate the utility of the beads of the invention as a molecular sieve.

FIG. 3 is a photomicrograph of the gel beads of the invention.

FIG. 4 is a photomicrograph of spherical microcapsules produced in accordance with the invention.

Among the water-insoluble β-1,3-glucans employable according to this invention are the polysaccharides elaborated by microorganisms of the genus Alcaligenes and of the genus Agrobacterium, such as the polysaccharide elaborated by *Alcaligenes faecalis* var. *myxogenes* 10C3K [Agricultural Biological Chemistry, Vol. 30, pages 196 et seq. (1966) by Harada et al.], the polysaccharide elaborated by the mutant strain, NTK-u (IFO 13140, ATCC 21680) of *Alcaligenes faecalis* var. *myxogenes* 10C3K (U.S. Pat. Nos. 3,754,925 and 3,822,250) (hereinafter referred to as PS-1), the polysaccharide elaborated by *Agrobacterium radiobacter* (IFO 13127, ATCC 6466) and its mutant strain U-19 (IFO 13126, ATCC 21679) (U.S. Pat. Nos. 3,754,925 and 3,822,250) (hereinafter referred to as PS-2), pachyman which occurs in the crude drug known as *Poria cocos* (Agr. Biol. Chem. Vol. 32, No. 10, P.1261(1968)), laminaran which is an ingredient of brown algae, the glucan which is a cell wall constituent of yeasts, and so forth. As preferred method for producing beads of such a glucan gel, there may be exemplified the method which comprises extruding, dripping or spraying a fluid containing a water-insoluble β-1,3-glucan into a heated oil bath and, thereby, causing the glucan to undergo gelation (Japanese Patent Application Laid Open No. 52953/1973); the method which comprises dissolving a water-insoluble β-1,3-glucan in an aqueous solution of sodium hydroxide and feeding the resultant solution through a drip nozzle into an aqueous solution of hydrogen chloride to neutralize and cause the glucan to undergo gelation (U.S. Pat. No. 3,899,480) and the method which comprises adding an alkaline aqueous solution of said water-insoluble β-1,3-glucan dropwise to an organic solvent which is not freely miscible with water and neutralizing the resultant dispersion with an organic acid.

In the last method, as examples of said alkaline aqueous solution which is able to dissolve water-insoluble β-1,3-glucans, there may be mentioned aqueous solutions of sodium hydroxide, potassium hydroxide, barium hydroxide, calcium hydroxide, lithium hydroxide, ammonia and so forth.

The pH range of the alkaline aqueous solution is usually from 9 to 14, preferably from pH 11 to 13.

The concentration of the water-insoluble β-1,3-glucan thus employed has an influence upon the average diameter of the resultant beads. Normally, it is selected from the range of about 0.5 to 10 percent. Generally speaking, the lower the concentration of β-1,3-glucan is, the larger is the diameter of the resultant beads.

As for the procedure of dispersing a solution of water-insoluble β-1,3-glucan in said organic solvent which is not freely miscible with water, said solution is preferably added dropwise under stirring. While there are no particular limits to the duration of time over which said dropwise addition is made except that it should not be long enough to cause hydrolysis of the water-insoluble β-1,3-glucan, a duration of time from 10 to 90 minutes is generally appropriate. In this operation, a surface active agent may be added to the organic solvent, if necessary. Generally, such surface active agent is preferably a nonionic surfactant, although this is not an exclusive choice. The concentration of the surfactant thus added with respect to the organic solvent may range from 0.1 to 20 percent and, preferably, 0.2 to 10 percent (W/V).

While the organic solvent to be thus employed may be any solvent that is not freely miscible with water, there may be mentioned, as typical examples, aromatic hydrocarbons and their derivatives (e.g. benzene, toluene, xylene, etc.), aliphatic hydrocarbons and their derivatives (e.g. chloroform, carbon tetrachloride, dichloroethane, n-hexane, cyclohexane, etc.), ethers (e.g. diethyl ether, isopropyl ether, etc.), esters (e.g. ethyl acetate, butyl acetate, etc.) and alcohols (e.g. n-butanol, isobutanol, etc.).

The rotational speed of the stirrer employed in dispersing the water-insoluble β-1,3-glucan in the above-mentioned organic solvent has significant effects on the diameters of the product beads. Generally, the higher the stirring speed is, the smaller is the diameter of the product beads. A preferred procedure for gelling the water-insoluble β-1,3-glucan dispersion comprises adding an acid to the dispersion, the acid which is soluble in said organic solvent not freely miscible with water. Among the preferred acids are formic acid, acetic acid, propionic acid and benzoic acid. While it depends upon the conditions of manufacture, the diameters of water-insoluble β-1,3-glucan gel beads are generally within the range of 5 to 1,000μ. In the application of the gel beads according to this invention as a gel filtration matrix, generally their diameters are desirably smaller to achieve higher separation efficiencies but, in consideration of pressure drop and other factors, the diameters of beads are preferably in the range of about 5 to 500μ and, for still better results, in the range of about 30 to 150μ.

To solve the problems accompanying the application of a matrix or carrier for immobilized enzymes and affinity chromatography, the inventors further developed a method of encapsulating a core material of small diameter with the water-insoluble β-1,3-glucan. Thus, we have succeeded in the production of gel beads (hereinafter called microcapsules) consisting of a fine core material and, by way of encapsulating material, said water-insoluble β-1,3-glucan, which may be made either to float on the water or to settle in water depending on the specific gravity of the particular core material selected. As said core material, there may be employed SIRASU (pumice ejected from volcanoes and the secondary deposit of such pumice) bead, pumice, alumina, silica, glass bead, hollow glass bead and so forth. Where the specific gravity of the core material is greater than 1, the microcapsules are packed into a column show flow rate properties even superior to those of water-insoluble β-1,3-glucan gel beads. Where the microcapsule has a specific gravity of less than 1, an enzyme or other active ingredient may be attached to the core to produce an immobilized enzyme preparation and, if this preparation is used in a batch reaction system where the reaction product separates out as a precipitate, the immobilized enzyme will float onto the reaction mixture and, therefore, considerably facilitate separation of the reaction product. There is thus provided a commercially very advantageous process.

The known gel filtration techniques are compatible with the gel beads according to this invention. In an exemplary technique, a column is packed with the water-insoluble β-1,3-glucan gel beads and, then, a suitable buffer solution is passed through the column at an appropriate flow rate to wash the bed. Then, a predetermined quantity of a similar buffer solution containing a sample is applied to the column. Elution is carried out using a similar buffer solution at a predetermined flow rate and the eluate is collected in fractions. This procedure can be applied to the separation of mixtures and molecular weight determination of proteins, polysaccharides and other substances.

Where the gel beads according to this invention are used as a carrier for immobilized enzymes or affinity chromatography, it has been found that the smaller the diameter of bead is, the greater is the amount of coupled enzymes and ligands. However, when the beads are used as packed into a column, pressure drop must again be taken into consideration. In this connection, the diameters of beads are preferably within the range of about 30 to 500μ and, for still better results, within the range of about 30 to 300μ.

To prepare an immobilized enzyme or a carrier-ligand complex for use in affinity chromatography, the process described in German Offenlegungsschrift No. 25 51 438 may for example by utilized. Thus, one part of water-insoluble β-1,3-glucan gel beads are suspended in 50 volume parts of water, followed by the addition of 20 to 60 volume parts of water containing 0.1 to 3 parts of a cyanogen halide. Under stirring at an optional temperature between 0° and 50° C., the pH of the reaction mixture is increased to pH 11 by the dropwise addition of a 2N-aqueous solution of sodium hydroxide, care being taken not to cause the gel beads to dissolve (at a rate of about 0.5 pH units/minute). The mixture is maintained at pH 11 for an additional quarter of an hour, whereby the activation reaction is carried to completion. After the reaction has been completed, the solids are recovered by filtration and rinsed with 10 times its volume of water. The activated gel beads thus obtained are insoluble in water and in aqueous solutions of alkalies and not heat-gelable, the dimensions and strength of individual beads being adequate enough to ensure sufficient flow rate when used as packed into columns.

Using these activated gel beads, carrier-ligand complexes may also be manufactured. A process for this purpose comprises reacting said activated gel beads with a substance containing a primary or secondary amino group e.g. an enzyme, protein, peptide, amino acid, coenzyme, enzyme substrate or inhibitor, antigen, antibody, hormone or the like, preferably in a weakly alkaline aqueous solution and at an optional temperature in the range of about 0° to about 50° C.

The following reference and working examples are intended merely to illustrate presently preferred embodiment to the present invention and not to restrict the scope of this invention.

REFERENCE EXAMPLE 1

The dyeability of the PS-1 gel beads obtained in Examples 2 (Neutralization method) and 19 (Heat method) was investigated using water-soluble dyes according to the method of Nakanishi et al [Carbohydrate Research 32 47–52 (1974)].

The results are set forth in Table 1.

TABLE 1

| | Dyeability Test | |
| --- | --- | --- |
| | Sample | |
| Dye | PS-1 beads (Neutralization method) | PS-1 beads (Heat method) |
| Congo red | + | + |
| Trypan blue | − | + |
| Aniline blue | + | + |
| Soluble blue | + | + |
| Fuchsine | + | − |
| Brilliant blue | − | − |
| Methylene blue | − | − |
| Toluidine blue O | − | − |

REFERENCE EXAMPLE 2

(1) The applicability of the PS-1 gel beads according to Example 1, given hereinafter, as a carrier for immobilized enzyme of affinity chromatography was investigated. (1)-(i) The above gel beads were packed into a column, 21.1 mm in inside diameter, to prepare a bed with a height of 50 mm. Then, water was passed through the bed by means of a volumetric pump and the relation of flow rate to pressure drop was investigated. The results are set forth in Table 2.

TABLE 2

| Flow rate (ml/hr.) | Pressure drop (mm H$_2$O) |
|---|---|
| 48.9 | 25 |
| 71.6 | 50 |
| 112 | 150 |

The results given in Table 2 show clearly that the gel beads according to this invention have excellent flow rate properties which make them highly suited for use as a chromatographic carrier. (1)-(ii) In a procedure for activating gel beads, 100 ml of distilled water was added to 133 ml of gel beads (corresponding to 5 g of PS-1 powder) to obtain a suspension. On the other hand, 5 g of BrCN was dissolved in 100 ml of distilled water. The suspension and solution were combined and the pH was gradually increased by the addition of 5N-NaOH until pH 11 was reached. The system was maintained at pH 11 for 15 minutes, whereby an activated gel of PS-1 was obtained. The gel was filtered through a glass filter and the cake was rinsed with 500 ml of distilled water.

For the purpose of investigating the capability of the above product to retain high flow rates under experimental conditions of column-chromatography, the pressure drops were determined as follows. Thus, the product was packed into a chromatographic column, 19.5 mm in diameter and 229 mm high, and water was passed through this column at varying flow rates by means of a volumetric pump to determine the changes in the heights of bed and pressure drops. The results are set forth in Table 3.

TABLE 3

| Flow rate (ml/hr.) | Pressure drop (mmHg) | Height of bed (mm) |
|---|---|---|
| 405 | 14 | 229 |
| 455 | 20 | 228 |
| 800 | 54 | 218 |

It will be seen that the beads had high rigidity and non-compressibility and that, as shown in FIG. 1 (The pressure drop is expressed with the height of the bed of beads being assumed as 1 meter), the flow rate properties of the beads are superior to the properties of agarose gel which is most commonly employed today, thus making the present beads better suited for use as a chromatographic carrier.

(1)-(iii) The following example is pertinent to the production of an immobilized enzyme preparation using PS-1 gel beads. 126 ml of the above activated PS-1 gel beads (corresponding to 5 g of PS-1 powder) was combined with a solution in 50 ml distilled water of 50.9 mg of the α-amino acid ester hydrolase of *Xanthomonas citri* (IFO 3835) (Japanese Patent Application Laid Open No. 25388/1972) (CMC-treated, lyophilizate). Following the addition of 50 ml of 0.2M-phosphate buffer (pH 8.0) and 24 ml of distilled water, the mixture was stirred at 5° C. and pH 8 for 20 hours. The reaction mixture was filtered and the cake was washed with 0.2M-glycine solution, 0.5M-aqueous sodium chloride and distilled water in that order to prepare an immobilized enzyme preparation.

By the above procedure, 95% of the protein was immobilized. The enzyme activity of this preparation was determined based on the rate of hydrolysis of D-phenylglycine methyl ester. According to this assay, 90% of the activity was found to have been immobilized.

REFERENCE EXAMPLE 3

The applicability of beads of PS-1 gel to gel filtration was investigated.

A glass column with an inside diameter of 26 mm was packed with the beads of PS-1 according to Example 4 to a height of 415 mm and washed with a 0.05M-Tris-HCl buffer (pH 7.5) containing 0.1M of KCl overnight at a flow rate of 30 ml/hr.

One ml of the same buffer solution, to which 3 mg of one of the samples mentioned in Table 4 had been added, was applied to the column and, thereafter, development was carried out with the same buffer solution at a flow rate of 30 ml/hr. The effluent was collected in 3 ml-fractions and their absorbancies at 280 mμ were determined, except that the phenol-sulfuric acid method was used for dextran. The results, given in Table 4, show that the samples emerged from the columns in the order of molecular weights, thus demonstrating the utility of the beads as a molecular sieve. The relation of molecular weight to distribution coefficient was such that, as shown in FIG. 2 for the above PS-1 gel, the exclusion limit in the molecular weight range for globular proteins was $1.1 \times 10^6$.

TABLE 4

| Sample | Mol. wt. | Effluent (ml) | Distribution coefficient |
|---|---|---|---|
| Dextran 2000 | 2,000,000 | 69 | |
| Cytochrome C | 12,400 | 215 | 0.96 |
| Bovine albumin | 67,000 | 172 | 0.68 |
| γ-Globulin | 160,000 | 152 | 0.55 |
| Glutamate dehydrogenase | 350,000 | 126 | 0.37 |

REFERENCE EXAMPLE 4

The applicability of the PS-1 gel beads according to Example 19, given hereinafter, as a carrier for immobilized enzyme was investigated.

In a procedure for activating gel beads, 100 ml of distilled water was added to 115 ml of gel beads (corresponding to 5 g of PS-1 powder) to obtain a suspension. On the other hand, 5 g of BrCN was dissolved in 100 ml of distilled water. The suspension and solution were combined and the pH was gradually increased by the addition of 5N-NaOH until pH 11 was reached. The system was maintained at pH 11 for 15 minutes, whereby an activated gel of PS-1 was obtained. The gel was filtered through a glass filter and the cake was rinsed with 500 ml of distilled water. 126 ml of the above activated PS-1 gel beads (corresponding to 5 g of PS-1 powder) was combined with a solution in 50 ml distilled water of 50.9 mg of the α-amino acid ester hydrolase of *Xanthomonas citri* (IFO 3835) (Japanese Patent Application Laid Open No. 25388/1972) (CMC-treated, lyophilizate). Following the addition of 50 ml of 0.2M-phosphate buffer (pH 8.0) and 24 ml of distilled water, the mixture was stirred at 5° C. and pH 8 for 20 hours. The reaction mixture was filtered and the cake was washed with 0.2M-glycine solution, 0.5M-aqueous sodium chloride and distilled water in that order to prepare an immobilized enzyme preparation.

By the above procedure, 92.9% of the protein was immobilized. The enzyme activity of this preparation was determined based on the rate of hydrolysis of D-phenylglycine methyl ester. According to this assay, 90% of the activity was found to have been immobilized.

REFERENCE EXAMPLE 5

The applicability of beads of PS-1 gel obtained in Example 19 to gel filtration was then investigated.

A glass column with an inside diameter of 15 mm was packed with the beads of PS-1 gel according to Example 19 to a height of 215 mm and washed with a 0.05M-Tris-HCl buffer (pH 7.5) containing 0.1M and KCl overnight at a flow rate of 21 ml/hr.

One ml of the same buffer solution, to which 3 mg of one of the samples mentioned in Table 5 had been added, was applied to the column and, thereafter, development was carried out with the same buffer solution at a flow rate of 21 ml/hr. The effluent was collected in 3 ml-fractions and their absorbancies at 280 m$\mu$ were determined, except that the phenol-sulfuric acid method was used for dextran. The results, given in Table 5, show that the samples emerged from the columns in the order of molecular weights, thus demonstrating the utility of the beads as a molecular sieve. The relation of molecular weight to distribution coefficient was such that the exclusion limit in the molecular weight range for globular proteins was $7.0 \times 10^5$.

TABLE 5

| Sample | Mol. wt. | Effluent (ml) | Distribution coefficient |
|---|---|---|---|
| Dextran 2000 | 2,000,000 | 15.8 | |
| Cytochrome C | 12,400 | 39.5 | 1.08 |
| Bovine albumin | 67,000 | 29.0 | 0.60 |
| Fibrinogen (ox) | 340,000 | 20.2 | 0.20 |

REFERENCE EXAMPLE 6

To 125 milliliters of PS-1 in the shape of beads (particle diameter 50–200 microns) (equivalent to about 5 g of PS-1 as dry weight) obtained in Example 9 were added 100 ml of water and 100 ml of 5% (W/V) cyanogen bromide.

At 25° C. and under stirring, 2N sodium hydroxide solution was added dropwise by means of an automatic titrator in such amounts as to increase the pH gradually at a rate of about 0.5 pH per minute until a final pH of 11 was established. The system was held at this pH 11 for about 15 minutes, whereby the reaction was carried to completion. Following this reaction, the solid matter was recovered by filtration and rinsed with 500 ml of distilled water. The above procedure provided an activated bead-shaped PS-1 (dry weight, 5.1 grams).

One gram of the above activated PS-1 gel beads (as dry weight) was suspended in 50 ml of 0.05M-phosphate buffer (pH 8.0) to prepare a suspension.

To this suspension was added 20 ml of said phosphate buffer solution in which 200 mg of $\epsilon$-aminocaproyl-D-tryptophan methyl ester as a ligand had been dissolved.

The mixture was reacted at 5° C. under gentle stirring for 20 hours.

Thereafter, the solid matter was recovered by means of a glass filter and washed with 500 ml of 0.05M-phosphate buffer (pH 8.0) containing 1M NaCl.

Based on the absorbance at 280 m$\mu$ of the above washings the percent immobilization of the ligand was calculated to be 22%.

A glass column with a diameter of 20 mm was packed with the affinity matrix obtained by the above procedure to a height of 100 mm and equilibrated with a 0.05M-Tris-HCl buffer (pH 8.0).

Two ml of the above buffer solution in which 10 mg of $\alpha$-chymotrypsin (manufactured by Worthington Biochemical Co., U.S.A.) had been dissolved was applied to the column and, thereafter, washing was carried out with 100 ml of the same buffer solution.

By the above procedure, 8% of the original protein (quantified by the absorbance at 280 m$\mu$) was emerged. The activity of $\alpha$-chymotrypsin determined as the esterase activity using benzoyl-L-tyrosine ethyl ester as the substrate was not encountered.

Further, elution was carried out with 100 ml of 0.1M-acetic acid. By the elution, 90% of the original protein and 96% of the activity was recovered.

EXAMPLE 1

To 9 g of PS-1 (See the text) powder was added 270 ml of purified water, followed by stirring to prepare a slurry. To this slurry was added 30 ml of 1N-NaOH, whereupon the PS-1 was dissolved to yield an aqueous solution of PS-1 and sodium hydroxide. A beaker of 2-liter capacity was filled with 1200 ml of toluene and 6 g of Emalex ®HC-30 (Nihon Emulsion Co. Ltd., Japan, polyoxyethylenehydrogenated castor oil derivative surfactant) and, under agitation with a screw-type stirrer at 800 r.p.m. the above aqueous solution of PS-1 and sodium hydroxide was added dropwise at room temperature. The resultant PS-1 dispersion was added to a mixture of 2000 ml of toluene and 100 ml acetic acid under stirring at 800 r.p.m. followed by stirring for about one additional hour. Then, the mixture was allowed to stand for about 3 hours, by the end of which time the product gel had settled. The solvent was removed by decantation and the residual sediment was rinsed 5 times with 2 l portions of purified water to bring the pH to neutral, the organic solvent being thereby completely removed. By the above procedure was obtained 240 ml of PS-1 gel.

This gel was found to have the following diameters.
30–50$\mu$: 4.0%
50–100$\mu$: 42.8%
100–200$\mu$: 36.8%
200–300$\mu$: 16.4%

Each particle was found to have a bead-like shape. A photomicrograph of these gel beads is shown in FIG. 3 (8 graduations on the scale are equal to 100$\mu$).

EXAMPLE 2

By a procedure similar to that discribed in Example 1, an aqueous solution containing sodium hydroxide and PS-1, prepared from 10 of PS-1 powder, 140 ml of purified water and 60 ml of 5N-NaOH, was dispersed in 1200 ml of toluene in the presence of 6.7 g of Emalex ®HC-30 by stirring at 800 r.p.m. The dispersion was added to a mixture of 2000 ml toluene and 100 ml acetic acid. By the above procedure was obtained 206 ml of gel beads from 50 to 150μ in diameter. This product was suited for use as a matrix.

EXAMPLE 3

The procedure of Example 1 was repeated, except that 6 g of Emalex ®HC-40 (Nihon Emulsion Co. Ltd., Japan) was used as the surfactant, to obtain 265 ml of gel beads from 50 to 250μ in diameter. The beads were suited for use as a matrix.

EXAMPLE 4

Using 6 g of Emalex ®HC-20 (Nihon Emulsion Co. Ltd. Japan), the procedure of Example 1 was repeated to obtain 280 ml of gel beads from 30 to 150μ in diameter.

EXAMPLE 5

Using 6 g of Emalex ®C-40 (Nihon Emulsion Co. Ltd., polyoxyethylene-castor oil derivative), the procedure of Example 1 was repeated to obtain 312 ml of gel beads from 15 to 100μ in diameter. These beads, too, were suitable for use as a matrix.

EXAMPLE 6

Using 6 g of Tween 60 as the surfactant, the procedure of Example 1 was repeated to obtain gel beads from 15 to 200μ in diameter. The beads were suited for use as a matrix.

EXAMPLE 7

Using benzene in lieu of toluene as the dispersion vehicle, the procedure of Example 1 was repeated to obtain 240 ml of gel beads which had diameters from 100 to 300μ. These beads were suited for use as a matrix.

EXAMPLE 8

With stirring at 1200 r.p.m., the procedure of Example 1 was repeated to obtain 223 ml of gel beads from 20 to 100μ in diameter. These beads were useful as a matrix.

EXAMPLE 9

The procedure of Example 1 was repeated except that formic acid was used in lieu of acetic acid as the neutralizer to obtain 250 ml of gel beads from 40 to 200μ in diameter, which were suited for use as a matrix.

EXAMPLE 10

To 3 g of pachyman powder was added 90 ml of purified water, followed by stirring to obtain a slurry. On addition of 10 ml of 5N-NaOH, the pachyman was dissolved. A beaker having a capacity of 1 liter was filled with 500 ml of toluene and 2 g of Emalex ®HC-30 and, under stirring at 800 r.p.m., the above aqueous solution of pachyman and sodium hydroxide was added dropwise at room temperature.

The resultant pachyman dispersion was added to a mixture of 2000 ml toluene and 100 ml acetic acid, followed by stirring for about an hour. The solvent was removed by decantation and the sedimented gel was rinsed with water. By the above procedure was obtained 80 ml of a pachyman gel from 50 to 300μ in diameter. This product was suited for use as a matrix.

EXAMPLE 11

Except that the stirring was effected at 2100 r.p.m., the procedure of Example 1 was repeated to obtain 280 ml of gel beads from 5 to 50μ in diameter. The beads were suited for use as a matrix.

EXAMPLE 12

Except that the stirring was effected at 400 r.p.m., the procedure of Example 1 was repeated to obtain 200 ml of gel beads from 200 to 1000μ in diameter. The beads were of use as a matrix.

EXAMPLE 13

3 g of PS-1 powder was dissolved by the addition of 144 ml of purified water and 16 ml of 1N-NaOH. To this solution was added 9 g of SIRASU beads (40–80 mesh, Sanki Engineering Co. Ltd., Japan) followed by stirring. Under stirring at 360 r.p.m. this mixture was added dropwise to a solution of 600 ml toluene and 2 g of Emalex ®HC-30 To this dispersion was added 15 ml of acetic acid to cause gelation. The reaction mixture was filtered through a nylon cloth and the cake was rinsed with water. As will be seen from FIG. 4 (8 graduations on the scale are equal to 100μ), a microscopic examination of the cake showed that there had been produced 20 to 40-mesh spherical microcapsules each consisting of SIRASU bead by way of core and PS-1 by way of shell.

EXAMPLE 14

The procedure of Example 13 was repeated except that dichloroethane was used in lieu of toluene to obtain microcapsules.

EXAMPLE 15

The procedure of Example 13 was repeated except that spherically molded alumina (Mizusawa Industrial Chemicals Ltd., Japan, Neo Bead C, 14–60 mesh) was used in lieu of SIRASU bands to obtain microcapsules.

EXAMPLE 16

The procedure of Example 13 was repeated except that SIRASU bead was replaced by glass beads (Nippon Electric Glass Co., Ltd., Japan, BH-W, 150–200 mesh) to obtain microcapsules.

EXAMPLE 17

Except that SIRASU bead was replaced by spherically molded silica (Mizusawa Industrial Chemicals Ltd., Japan, Silbead W, 4–6 mesh), the procedure of Example 13 was repeated to obtain microcapsules.

EXAMPLE 18

Except that pumice (Ishikawaraito Co. Ltd., Japan, 28–40 mesh) was used in lieu of SIRASU bead, the procedure of Example 13 was repeated to obtain microcapsules.

EXAMPLE 19

To 20 g of PS-1 powder was added 660 ml of distilled water, followed by stirring to prepare a suspension. This suspension was added dropwise into 2 l of corn salad oil heated to 80°–85° C. under agitation with a homomixer at 2500 r.p.m., followed by stirring for 30 additional minutes. After the resultant PS-1 dispersion was cooled to room temperature, the corn salad oil was removed by decantation and then the sedimental gel was rinsed with 400 ml of toluene. This rinsing was repeated completely to remove the salad oil.

The toluene was removed with distilled water by decantation. By the above procedure was obtained 460 ml of PS-1 gel. This gel was found to have the following diameters.

50–100μ: 22.5%
100–150μ: 46%
150–200μ: 21%
200–250μ: 5%
250–300μ: 4%
300–350μ: 1.5%

What we claim is:

1. In a chemical method comprising the employment of a polysaccharide matrix packed in a column the improvement according to which the matrix material is a water-insoluble β-1,3-glucan gel which is shaped in the form of beads with a diameter within the range of about 5 to 1000μ.

2. A method according to claim 1 which is a method for the preparation of a carrier for immobilized enzymes, affinity chromatography, gel filtration or ion exchange.

3. A method according to claim 1 wherein the beads have a diameter within the range of about 30 to 300μ.

4. A method according to claim 1 wherein the matrix material is in the shape of beads coated with a water-insoluble β-1,3-glucan on a core material.

5. A method according to claim 4 wherein the core material is SIRASU bead.

6. A method according to claim 4 wherein the core material is spherically molded alumina.

7. A method according to claim 4 wherein the core material is glass bead.

8. A method according to claim 4 wherein the core material is pumice.

9. A method according to claim 3 wherein the beads have diameter within the range of about 30 to 150μ.

10. A method according to claim 1 wherein the water-insoluble β-1,3-glucan is produced by a microorganism belonging to the genus Alcaligenes, the genus Agrobacterium or *Poria cocos*.

11. A method according to claim 10 wherein the microorganism is *Alcaligenes faecalis*.

12. A method according to claim 10 wherein the microorganism is *Agrobacterium radiobacter*.

13. A method according to claim 10 wherein the microorganism is *Poria cocos*.

* * * * *